(12) United States Patent
SeyedzadehDelcheh et al.

(10) Patent No.: US 12,026,387 B2
(45) Date of Patent: Jul. 2, 2024

(54) PAGE SWAPPING TO PROTECT MEMORY DEVICES

(71) Applicant: Advanced Micro Devices, Inc., Santa Clara, CA (US)

(72) Inventors: Seyedmohammad SeyedzadehDelcheh, Sammamish, WA (US); Sriseshan Srikanth, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 38 days.

(21) Appl. No.: 17/703,491

(22) Filed: Mar. 24, 2022

(65) Prior Publication Data
US 2023/0315320 A1  Oct. 5, 2023

(51) Int. Cl.
*G06F 3/06* (2006.01)
(52) U.S. Cl.
CPC .......... *G06F 3/0644* (2013.01); *G06F 3/0604* (2013.01); *G06F 3/0673* (2013.01)
(58) Field of Classification Search
CPC ..... G06F 3/0644; G06F 3/0604; G06F 3/0673
See application file for complete search history.

(56) References Cited

U.S. PATENT DOCUMENTS

| | | | |
|---|---|---|---|
| 10,642,618 B1 | 5/2020 | Hakewill et al. | |
| 10,950,292 B1 | 3/2021 | Seyedzadehdelcheh et al. | |
| 11,488,654 B2 | 11/2022 | Seyedzadehdelcheh | |
| 2010/0169708 A1* | 7/2010 | Rudelic | G06F 12/08 711/E12.083 |
| 2013/0268741 A1* | 10/2013 | Daly | G06F 11/3471 711/E12.002 |
| 2019/0050332 A1 | 2/2019 | Alameldeen et al. | |
| 2019/0096472 A1 | 3/2019 | Kang et al. | |
| 2020/0005857 A1 | 1/2020 | Ito et al. | |
| 2020/0167327 A1 | 5/2020 | Breslow | |
| 2021/0294695 A1* | 9/2021 | Li | G06F 11/3037 |
| 2021/0390998 A1 | 12/2021 | Delcheh et al. | |
| 2022/0035735 A1* | 2/2022 | Bhardwaj | G06F 12/0246 |
| 2023/0017824 A1* | 1/2023 | Park | G06F 3/0683 |
| 2023/0064745 A1* | 3/2023 | Dirik | G06F 3/0604 |

OTHER PUBLICATIONS

Christensen et al., "A new analysis of the false positive rate of a Bloom filter", Aug. 3, 2010, Elsevier B.V. (Year: 2010).*

(Continued)

*Primary Examiner* — Gurtej Bansal
(74) *Attorney, Agent, or Firm* — FIG. 1 Patents (57) ABSTRACT

A page swapping memory protection system tracks accesses to physical memory pages, such as in a table with each row storing a physical memory page address and a counter value. This counter value records the number of accesses (e.g., read access or write accesses) to the corresponding physical memory page. In response to one of the counters exceeding a threshold value, the corresponding physical memory page is swapped with another page in physical memory (e.g., a page the table indicates has a smallest number of accesses). According, unreliability in the physical memory introduced due to frequent accesses to a particular physical memory page is mitigated.

20 Claims, 6 Drawing Sheets

(56) References Cited

OTHER PUBLICATIONS

Aweke, Zelalem Birhanu, et al., "ANVIL: Software-Based Protection Against Next-Generation Rowhammer Attacks", ACM SIGPLAN Notices, vol. 51, No. 4 [retrieved Oct. 12, 2021]. Retrieved from the Internet <http://www.seclab.cs.stonybrook.edu/seclab/pubs/ANVIL.pdf>., Mar. 25, 2016, 13 Pages.

Drongowski, Paul J., et al., "Instruction-Based Sampling: A New Performance Analysis Technique for AMD Family 10h Processors", Advanced Micro Devices Inc. [retrieved Oct. 14, 2021]. Retrieved from the Internet <https://composter.com.ua/documents/AMD_IBS_paper_EN.pdf>., Nov. 16, 2007, 14 Pages.

Kegel, Andrew G, et al., "U.S. Application as Filed", U.S. Appl. No. 16/172,384, filed Oct. 26, 2018, 23 pages.

Kim, Dae-Hyun, et al., "Architectural Support for Mitigating Row Hammering in DRAM Memories", IEEE Computer Architecture Letters, vol. 14, No. 1 [retrieved Oct. 14, 2021]. Retrieved from the Internet <http://memlab.ece.gatech.edu/papers/CAL_2014_1.pdf>., Jan. 1, 2015, 4 Pages.

Kim, Yoongu, et al., "Flipping bits in memory without accessing them: an experimental study of DRAM disturbance errors", ACM SIGARCH Computer Architecture News, vol. 42, No. 3 [retrieved Oct. 12, 2021]. Retrieved from the Internet <https://people.cs.pitt.edu/~znati/Courses/cs2001/2001pprs/row-hammering.pdf>., Jun. 14, 2014, 12 Pages.

Qureshi, Moinuddin K, et al., "Enhancing lifetime and security of PCM-based Main Memory with Start-Gap Wear Leveling", 2009 42nd Annual IEEE/ACM International Symposium on Microarchitecture (MICRO) [retrieved Jun. 2, 2022]. Retrieved from the Internet <https://doi.org/10.1145/1669112.1669117>., Dec. 2009, 10 pages.

Seyedzadeh, Seyed Mohammad, et al., "Mitigating Wordline Crosstalk Using Adaptive Trees of Counters", ACM/IEEE 45th Annual International Symposium on Computer Architecture (ISCA) [retrieved Oct. 14, 2021]. Retrieved from the Internet <https://arxiv.org/pdf/1806.02498.pdf>., Jun. 2018, 12 Pages.

Yağlikçi, Giray A., et al., "BlockHammer: Preventing RowHammer at Low Cost by Blacklisting Rapidly-Accessed DRAM Rows", arXiv [retrieved Oct. 14, 2021]. Retrieved from the Internet <https://arxiv.org/pdf/2102.05981.pdf>., Feb. 11, 2021, 15 Pages.

Zhou, Sheng-Hua, et al., "An ultra-low power CMOS random number generator", Solid-State Electronics, vol. 52, No. 2 [retrieved Oct. 12, 2021]. Retrieved from the Internet <https://citeseerx.ist.psu.edu/viewdoc/download?doi=10.1.1.667.2832&rep=rep1&type=pdf>., Feb. 2008, 6 Pages.

U.S. Appl. No. 16/902,204, filed Oct. 20, 2021, "Non-Final Office Action", U.S. Appl. No. 16/902,204, filed Oct. 20, 2021, 15 pages.

U.S. Appl. No. 16/902,204, filed Apr. 20, 2022, "Notice of Allowance", U.S. Appl. No. 16/902,204, filed Apr. 20, 2022, 9 pages.

\* cited by examiner

PAGE SWAPPING TO PROTECT MEMORY DEVICES

BACKGROUND

Noon Computer technology is regularly advancing, resulting in faster computers. One such area of advancement is memory where the number of memory cells in a given die area is increasing. This increase is a result of various factors, such as reducing the size of memory cells or reducing the proximity of memory cells.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Computers use various types of memory, such as volatile memory (e.g., dynamic random access memory (DRAM)) and nonvolatile memory (e.g., Flash memory or phase-change memory (PCM)). The demand for high memory capacity is increasing, resulting in designers scaling down memory technology by reducing the proximity and size of cells and packing more cells in the same die area.

One problem experienced with memory is that different factors influence the reliability of the memory or the lifespan of the memory. For example, for DRAM, as memory is scaled down (e.g., below the 22 nanometer size), electromagnetic coupling (crosstalk) increases and results in frequent accesses to one page of memory creating disturbance errors in other pages of memory. This crosstalk is exploitable by malicious users or programs that attempt to alter values in one page or row of memory by repeatedly accessing the same row of memory, an attack referred to as row hammering. By way of another example, Flash memory oftentimes has a limited lifespan, resulting in too many writes to a page of the Flash memory making the page unreliable. By way of another example, in PCM heat buildup resulting from frequent accesses to one page of memory causes at least one adjacent page to be unreliable.

The techniques discussed herein track accesses to physical memory pages, such as in a table with each row storing a physical memory page address and a counter value. This counter value records the number of accesses (e.g., read access or write accesses) to the corresponding physical memory page. In response to one of the counters exceeding a threshold value, the corresponding physical memory page is swapped with another page in physical memory (e.g., a page the table indicates has a smallest number of accesses). Accordingly, physical memory is protected against unreliability introduced due to frequent accesses to a particular physical memory page.

In some examples, the techniques described herein relate to a method including: receiving a first physical memory page address of a first memory page in a physical memory; determining whether the first memory page has been accessed at least a threshold number of times; and swapping, in response to determining that the first memory page has been accessed at least the threshold number of times, the first memory page with a second memory page in the physical memory that has not been accessed at least the threshold number of times.

In some examples, the techniques described herein relate to a method, wherein the physical memory is dynamic random access memory and the determining includes determining whether the first memory page has been read from the physical memory at least the threshold number of times.

In some examples, the techniques described herein relate to a method, wherein the physical memory is phase-change memory and the determining includes determining whether the first memory page has been written to the physical memory at least the threshold number of times.

In some examples, the techniques described herein relate to a method, wherein the physical memory is Flash memory and the determining includes determining whether the first memory page has been written to the physical memory at least the threshold number of times.

In some examples, the techniques described herein relate to a method, further including checking whether the first physical memory page address is in a probabilistic data structure, and the determining including determining, in response to the first physical memory page address being in the probabilistic data structure, whether the first memory page has been accessed at least the threshold number of times.

In some examples, the techniques described herein relate to a method, the determining including checking whether a first counter value corresponding to the first physical memory page address in a table equals or exceeds the threshold number of times.

In some examples, the techniques described herein relate to a method, further including: receiving a second physical memory page address of a third memory page in the physical memory; determining whether the second physical memory page address is in the table; in response to the second physical memory page address not being in the table: removing a bottommost physical memory page address from the table; and replacing the bottommost physical memory page address with the second physical memory page address and setting a second counter value corresponding to the second physical memory page address in the table to a value of 1.

In some examples, the techniques described herein relate to a method, further including: receiving a second physical memory page address of a third memory page in the physical memory; determining whether the third memory page has been accessed at least the threshold number of times; and incrementing, in response to determining that the third memory page has not been accessed at least the threshold number of times, a second counter value corresponding to the second physical memory page address in the table.

In some examples, the techniques described herein relate to a method, further including: receiving a third counter value corresponding to a third physical memory page address that is a topmost physical memory page address in the table; determining whether the second counter value is greater than the third counter value; and swapping, in response to the second counter value being greater than the third counter value, a row in the table including the second physical memory page address with a row in the table including the third physical memory page address.

In some examples, the techniques described herein relate to a method including: obtaining a first hash value generated by applying a hash function to a physical memory address of a first memory page in a physical memory, the first hash value corresponding to a first set of memory pages including the first memory page; determining, based on the first hash value, whether the first set of memory pages has been accessed at least a threshold number of times; and swapping, in response to determining that the first set of memory pages has been accessed at least the threshold number of times, the first set of memory pages with a second set of memory pages in the physical memory that have not been accessed at least the threshold number of times.

In some examples, the techniques described herein relate to a method, further including checking whether the first hash value is in a probabilistic data structure, and the determining including determining, in response to the first hash value being in the probabilistic data structure, whether the first set of memory pages has been accessed at least the threshold number of times.

In some examples, the techniques described herein relate to a method, the determining including checking whether a first counter value corresponding to the first hash value in a table equals or exceeds the threshold number of times.

In some examples, the techniques described herein relate to a method, further including: obtaining a second hash value by applying the hash function to a physical memory page address of a second memory page in the physical memory, the second hash value corresponding to a third set of memory pages including the second memory page; determining whether the second hash value is in the table; in response to the second hash value not being in the table: removing a bottommost hash value from the table; and replacing the bottommost hash value with the second hash value and setting a second counter value corresponding to the second hash value in the table to a value of 1.

In some examples, the techniques described herein relate to a method, further including: obtaining a second hash value by applying the hash function to a physical memory page address of a second memory page in the physical memory, the second hash value corresponding to a third set of memory pages including the second memory page; determining, based on the second hash value, whether the third set of memory pages has been accessed at least the threshold number of times; and incrementing, in response to determining that the third set of memory pages have not been accessed at least the threshold number of times, a second counter value corresponding to the second hash value in the table.

In some examples, the techniques described herein relate to a method, further including: obtaining a third counter value corresponding to a third hash value that is a topmost hash value in the table; determining whether the second counter value is greater than the third counter value; and swapping, in response to the second counter value being greater than the third counter value, a row in the table including the second hash value with a row in the table including the third hash value.

In some examples, the techniques described herein relate to a system including: a probabilistic data structure control module to receive a first physical memory address of a first memory page in a physical memory and determine whether the first physical memory address is in the probabilistic data structure; and a page swapping module to determine, in response to determining that the first physical memory address is in the probabilistic data structure, whether the first memory page has been accessed at least a threshold number of times and swap, in response to determining that the first memory page has been accessed at least the threshold number of times, the first memory page with a second memory page in the physical memory that has not been accessed at least the threshold number of times.

In some examples, the techniques described herein relate to a system, wherein the physical memory is dynamic random access memory and the page swapping module is to determine whether the first memory page has been read from the physical memory at least the threshold number of times.

In some examples, the techniques described herein relate to a system, wherein the physical memory is Flash memory and the determining by the page swapping module comprises determining whether the first memory page has been written to the physical memory at least the threshold number of times.

In some examples, the techniques described herein relate to a system, wherein the page swapping module is further to determine whether the first memory page has been accessed at least the threshold number of times by checking whether a first counter value corresponding to the first physical memory page address in a table equals or exceeds the threshold number of times.

In some examples, the techniques described herein relate to a system, wherein the probabilistic data structure control module is further to receive a second physical memory page address of a third memory page in the physical memory; and the page swapping module is further to determine whether the third memory page has been accessed at least the threshold number of times, and increment, in response to determining that the third memory page has not been accessed at least the threshold number of times, a second counter value corresponding to the second physical memory page address in the table.

Figure 1:
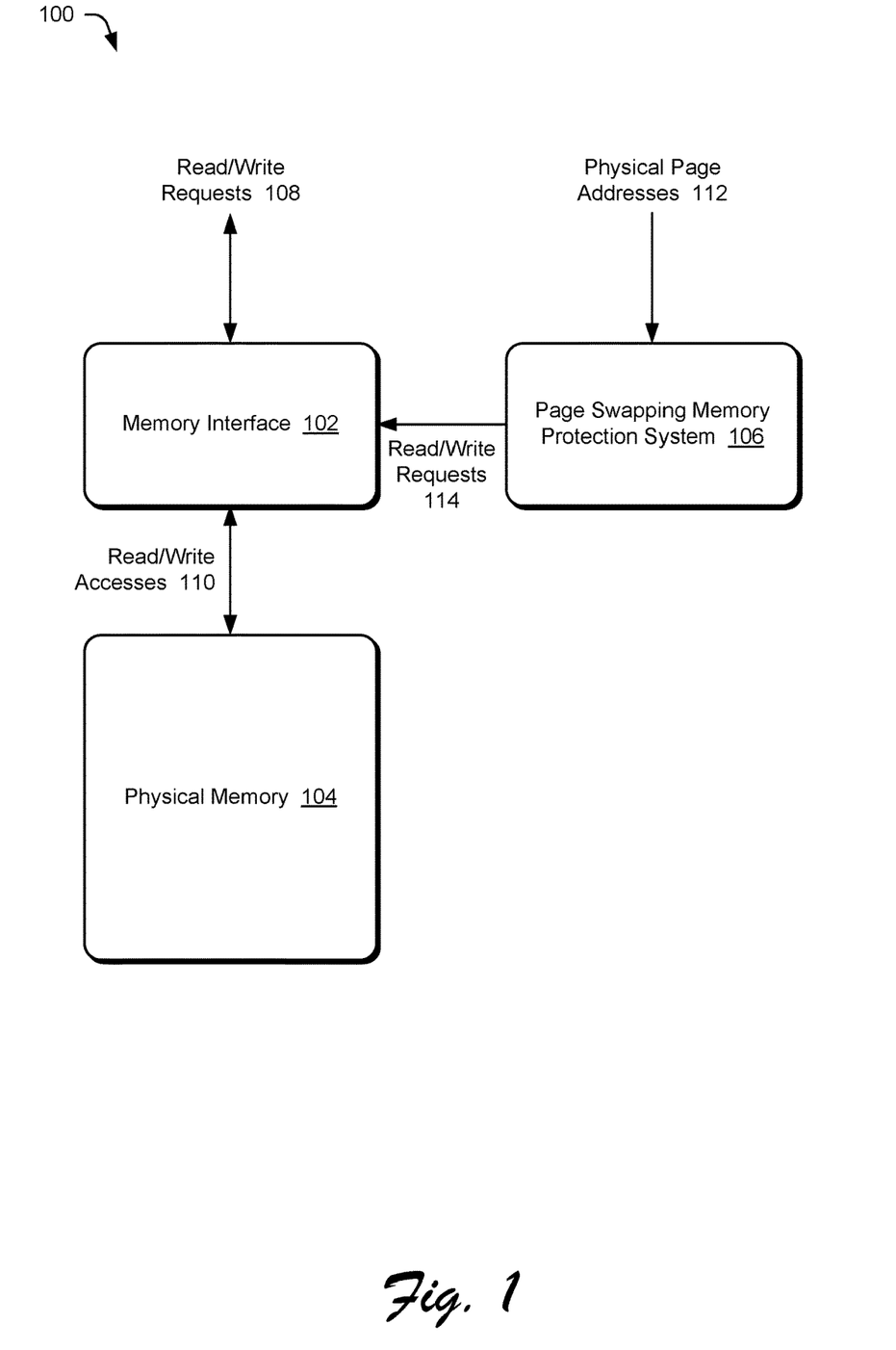
FIG. 1 is an illustration of a non-limiting example memory system that is operable to employ the page swapping to protect memory devices described herein.

FIG. 1 is an illustration of a non-limiting example memory system 100 that is operable to employ the page swapping to protect memory devices described herein. The memory system 100 includes a memory interface 102, a physical memory 104, and a page swapping memory protection system 106. The physical memory 104 is any of a variety of volatile memory (e.g., DRAM) or nonvolatile memory (e.g., Flash memory, PCM, or multi-level cell (MLC) PCM)).

The memory interface 102 manages reading data from and writing data to the physical memory 104. The memory interface 102 is, for example, a memory controller that receives read and write requests 108 and performs the corresponding read or write access 110 to the physical memory 104, returning any appropriate data (e.g., the requested data for a write access). The memory interface 102 receives the read and write requests 108 from any of various sources, such as a cache controller, the operating system of a computing device implementing the memory system 100, and so forth. The memory interface 102 supports paging, where pages of virtual memory are mapped to pages of physical memory 104. Each page of physical memory 104 includes one or more rows of physical memory (e.g., one or more rows in a bank of physical memory, such as DRAM).

The page swapping memory protection system 106 receives physical page addresses 112. The physical page address is the address of a physical memory page (also referred to as a physical page) that includes the physical memory address accessed for a read or write request 108 or the address of a physical memory page that includes the physical memory address that was estimated or predicted to be included in a read or write request 108. In one or more implementations, the physical page addresses 112 are for only certain types of physical page accesses, which vary based on the type of physical memory 104. For example, the physical page addresses 112 are for read accesses if the physical memory 104 is DRAM. By way of another example, the physical page addresses 112 are for write accesses if the physical memory 104 is PCM or Flash memory. Additionally or alternatively, the page swapping memory protection system 106 receives both read and write accesses and tracks only some of those accesses (e.g., read accesses for DRAM, write accesses for PCM or Flash memory).

The page swapping memory protection system 106 receives the physical page addresses 112 from any of a variety of sources. In one or more implementations, the page swapping memory protection system 106 receives the physical page addresses 112 from a page handler, which manages memory (e.g., physical memory 104 and virtual memory) in a device and maintains a record of which memory pages are stored where in physical memory 104 or elsewhere (e.g., on a disk or other nonvolatile memory). The page handler walks a software page table in response to a cache miss to locate where a requested memory page is currently located. The page handler walks the software table in response to, for example, a virtual address of a sampled cache miss by a processor of a computing device implementing the memory system 100 implementing an Instruction-Based Sampling profiling technique. Additionally or alternatively, the page swapping memory protection system 106 receives the physical page addresses 112 from other sources, such as the memory interface 102.

In one or more implementations, the page swapping memory protection system 106 is implemented in software. For example, the page swapping memory protection system 106 is part of an operating system of a computing device implementing the memory system 100 or software of the memory interface 102. Additionally or alternatively, the page swapping memory protection system 106 is implemented in hardware. For example, page swapping memory protection system 106 is implemented in the same device package or integrated circuit as the physical memory 104. By way of another example, the page swapping memory protection system 106 resides in the same device package or integrated circuit as the memory interface 102.

Although the page swapping memory protection system 106 is illustrated as receiving the physical page addresses 112, additionally or alternatively the page swapping memory protection system 106 receives an indication of the physical page addresses 112. This indication is, for example, a hash value generated by applying a hash function to a physical memory address as discussed in more detail below.

The page swapping memory protection system 106 tracks accesses to physical memory pages of the physical memory 104, such as in a table with each row storing a physical memory page address and a counter value. This counter value records the number of accesses to the corresponding physical memory page. In response to one of the counters exceeding a threshold value, the page swapping memory protection system 106 issues read and write requests 114 to swap the corresponding physical memory page with another page in physical memory 104 (e.g., a page the table indicates has a fewest number of accesses). This swapping protects the physical memory 104 from becoming unreliable or by wear leveling the physical memory 104.

The memory system 100 is implementable in any of a variety of different types of computing devices that include or use physical memory 104. For example, the memory system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

Figure 2:
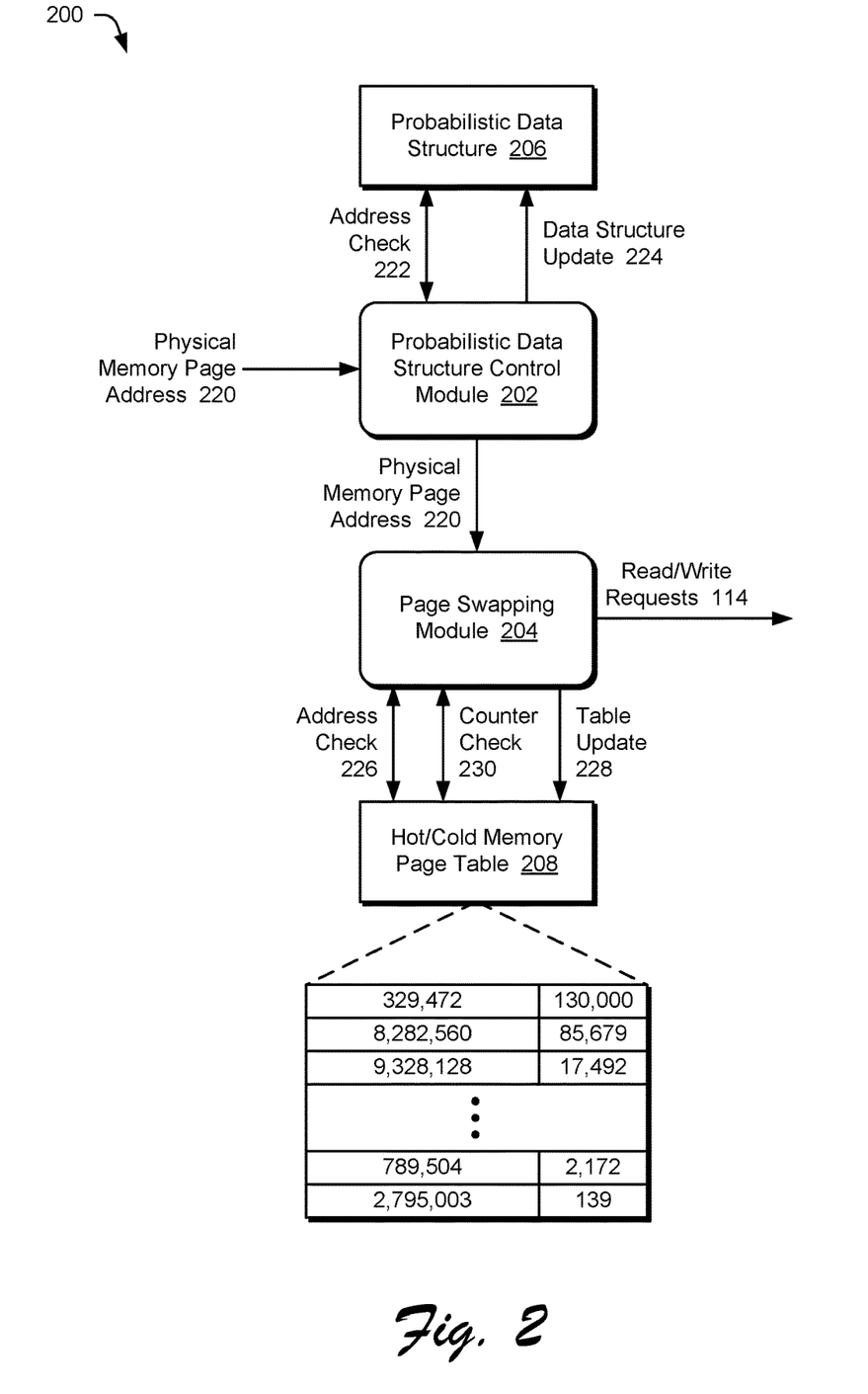
FIG. 2 illustrates an example of the architecture of the page swapping memory protection system.

FIG. 2 illustrates an example 200 of the architecture of the page swapping memory protection system 106. The page swapping memory protection system 106 includes a probabilistic data structure control module 202, a page swapping module 204, a probabilistic data structure 206, and a hot/cold memory page table 208.

The probabilistic data structure control module 202 receives a physical memory page address 220. The physical memory page address 220 is received from various sources as discussed above. The probabilistic data structure control module 202 performs an address check 222 to determine whether the physical memory page address 220 is in the probabilistic data structure 206. The probabilistic data structure 206 maintains a compact representation of likely blocks of memory present in the last level cache of the device implementing the page swapping memory protection system 106. If the physical memory page address 220 is not in the probabilistic data structure 206 then the physical memory page is assumed to not be in the last level cache and not in the hot/cold memory page table 208. Accordingly, the probabilistic data structure control module 202 provides a data structure update 224 to the probabilistic data structure 206 so that the physical memory page address 220 is represented in the probabilistic data structure 206.

Any of a variety of probabilistic data structures are usable as probabilistic data structure 206. In one or more implementations, the probabilistic data structure 206 is a bloom filter. To use a bloom filter, a particular number of hash functions (e.g., 3) are applied to a physical memory page address and the resultant hash values identify bits of the bloom filter that correspond to the physical memory page address. To update the bloom filter to include the physical memory page address 220 (e.g., insert the physical memory page address 220 into the bloom filter), the bits of the bloom filter that correspond to the physical memory page address 220 are set to a particular value (e.g., 1). To check whether the physical memory page address 220 is in the bloom filter, the bits of the bloom filter that correspond to the physical memory page address 220 are checked. If the checked bits all have a particular value (e.g., 1), then the physical memory page address 220 is in the bloom filter. However, if one or more of the bits do not have the particular value (e.g., if one or more of the bits have a value of 0) or if the number of bits that do not have the particular value is greater than half the number of bits (e.g., in implementations with 7 hash functions and thus 7 bits corresponding to the physical memory page address, if 4 or more of the bits have a value of 0), then the physical memory page address 220 is not represented in the bloom filter.

It is to be appreciated that after a certain number of physical memory page address insertions into the probabilistic data structure 206 the false positive rate of checking whether a physical memory page address is in the probabilistic data structure 206 increases rapidly. Accordingly, in one or more implementations the probabilistic data structure control module 202 clears the probabilistic data structure 206 after some event has occurred, such as a particular number of physical memory page address insertions has been made, a particular number of milliseconds has passed, the probabilistic data structure 206 has more than a threshold number of particular values (e.g., more than 90% of the bloom filter's bits have values of 1), and so forth.

If the physical memory page address 220 is in the probabilistic data structure 206, the probabilistic data structure control module 202 provides the physical memory page address 220 to the page swapping module 204. The page swapping module 204 makes an address check 226 to determine whether the physical memory page address 220 is in the hot/cold memory page table 208. The hot/cold memory page table 208 is a record of physical memory page addresses that have been accessed (e.g., written to or read from). A hot memory page refers to a memory page that has been written to a large number of times (e.g., greater than a threshold number of times, such as 130,000), as indicated by the hot/cold memory page table 208. A cold memory page refers to a memory page that has been written to a small number of times (e.g., less than 5% of the threshold number of times that identifies a hot memory page (e.g., less than 6,500 times) or less than the threshold number of times that identifies a hot memory page) as indicated by the hot/cold memory page table 208. It is possible that some memory pages are considered neither hot memory pages nor cold memory pages, but such memory pages are still hot or cold relative to one another. For example, if a memory page has been accessed 110,000 times and is thus not considered hot or cold, the memory page is still hotter than a memory page that has been accessed 500 times and colder than a memory page that has been accessed 125,000 times.

In the example 200, the hot/cold memory page table 208 includes one row for each of multiple physical memory page addresses. The hot/cold memory page table 208 includes two columns, one column for the physical memory page address and one column for a counter value. The counter value indicates how many times the corresponding physical memory page address has been accessed. For example, the hot/cold memory page table 208 in the example 200 indicates that physical memory page address 329,472 has a counter value of 130,000, the physical memory page address 8,282,560 has a counter value of 85,679, the physical memory page address 9,328,128 has a counter value of 17,492, the physical memory page address 789,504 has a counter value of 2,172, and the physical memory page address 2,795,003 has a counter value of 139.

The number of rows in the hot/cold memory page table 208 is determined in any of a variety of manners, such as by a developer or designer of the page swapping memory protection system 106 or a device including the page swapping memory protection system 106, by a vendor or distributor of the page swapping memory protection system 106 or a device including the page swapping memory protection system 106, and so forth. In one or more implementations, the number of rows in the hot/cold memory page table 208 is determined based on the size of a bank of physical memory (e.g., a DRAM bank), such as a particular percentage (e.g., 1%) of the number of rows in the DRAM bank.

If the physical memory page address 220 is not in the hot/cold memory page table 208, the page swapping module 204 provides a table update 228 to the hot/cold memory page table 208 to add the physical memory page address 220 to the hot/cold memory page table 208. If the hot/cold memory page table 208 is not full, then the page swapping module 204 adds the physical memory page address 220 to an empty row of the hot/cold memory page table 208, such as to the bottom of the hot/cold memory page table 208 or just below the bottommost physical memory page address in the hot/cold memory page table 208. If the hot/cold memory page table 208 is full, then the page swapping module 204 evicts (removes) one physical memory page address from the hot/cold memory page table 208, replaces the evicted physical memory page address with the physical memory page address 220, and sets the counter value for the physical memory page address 220 in the hot/cold memory page table 208 at 1. In one or more implementations, the physical memory page address that is evicted from the hot/cold memory page table 208 is the physical memory page address having a smallest counter value (e.g., the bottommost physical memory page address in the hot/cold memory page table 208).

If the physical memory page address 220 is in the hot/cold memory page table 208, the page swapping module 204 makes a counter check 230 to determine whether the counter value of the physical memory page address satisfies (e.g., equals or exceeds) a threshold value. In one or more implementations this threshold value is set to be just before or at the number of accesses that are expected to result in the physical memory becoming unreliable. For example, if for DRAM after approximately 130,000 read accesses to a particular row of physical memory the adjacent and some non-adjacent rows are expected to become unreliable due to crosstalk, the threshold value is set at 130,000. The threshold value is set in any of a variety of manners, such as by a developer or designer of the page swapping memory protection system 106 or a device including the page swapping memory protection system 106, by a vendor or distributor of the page swapping memory protection system 106 or a device including the page swapping memory protection system 106, and so forth.

If the counter value of the physical memory page address 220 does not satisfy the threshold value, the page swapping module 204 provides a table update 228 that increments (e.g., by 1) the counter value for the physical memory page address. The page swapping module 204 also compares the incremented counter value for the physical memory page address to the counter value for the physical memory page address in the hot/cold memory page table 208 having a largest counter value (e.g., the topmost physical memory page address in the hot/cold memory page table 208). If the incremented counter value for the physical memory page address is not greater than the counter value for the physical memory page address in the hot/cold memory page table 208, then no further changes are made to the hot/cold memory page table 208. However, if the incremented counter value for the physical memory page address is greater than the counter value for the physical memory page address in the hot/cold memory page table 208, then the page swapping module 204 swaps the rows of the two physical memory page addresses in the hot/cold memory page table 208. This results in the rows of the hot/cold memory page table 208 being organized over time so that the topmost row includes the physical memory page address having the largest counter value and the bottommost row includes the physical memory page address having the smallest counter value.

By way of example, if the physical memory page address 220 is 9,328,128 (which is row 3 of the hot/cold memory page table 208), the page swapping module 204 increments the counter value for the physical memory page address 220 to 17,493. The page swapping module 204 also compares the counter value in row 3 to the counter value in row 1, determines that the counter value in row 3 is not greater than the counter value in row 1, and thus makes no further changes in the hot/cold memory page table 208. However, if the counter value in row 3 had been greater than the counter value in row 1, the page swapping module 204 would have swapped the two rows so that row 1 had the physical memory page address 9,328,128 and counter value 17,493, and row 3 had the physical memory page address 329,472 and counter value 130,000.

If the counter value of the physical memory page address 220 does satisfy (e.g., equals or exceeds) the threshold value (e.g., the memory page is a hot memory page), the page swapping module 204 swaps the memory page at the physical memory page address 220 with another memory page in the physical memory that has not been accessed at least the threshold number of times (e.g., a cold memory page). In one or more implementations, the page swapping module 204 selects a cold memory page having a smallest counter value (e.g., the memory page having a bottommost physical memory page address in the hot/cold memory page table 208). The page swapping module 204 issues read and write requests 114 (e.g., to the memory interface 102) to swap the two memory pages. The page swapping module 204 also notifies other appropriate components of the memory interface 102 or operating system of the computing device implementing the page swapping module 204 (e.g. notifies a page handler) of the swapping of the physical memory pages.

For example, if the physical memory page address 220 is 329,472 and the threshold value is 130,000, the page swapping module 204 selects as a cold page the physical memory page at physical memory page address 2,795,003. The page swapping module 204 swaps the two memory pages, so the physical memory page that was at physical memory page address 329,472 is now at physical memory page address 2,795,003, and the physical memory page that was at physical memory page address 2,795,003 is now at physical memory page address 329,472.

Figure 3:
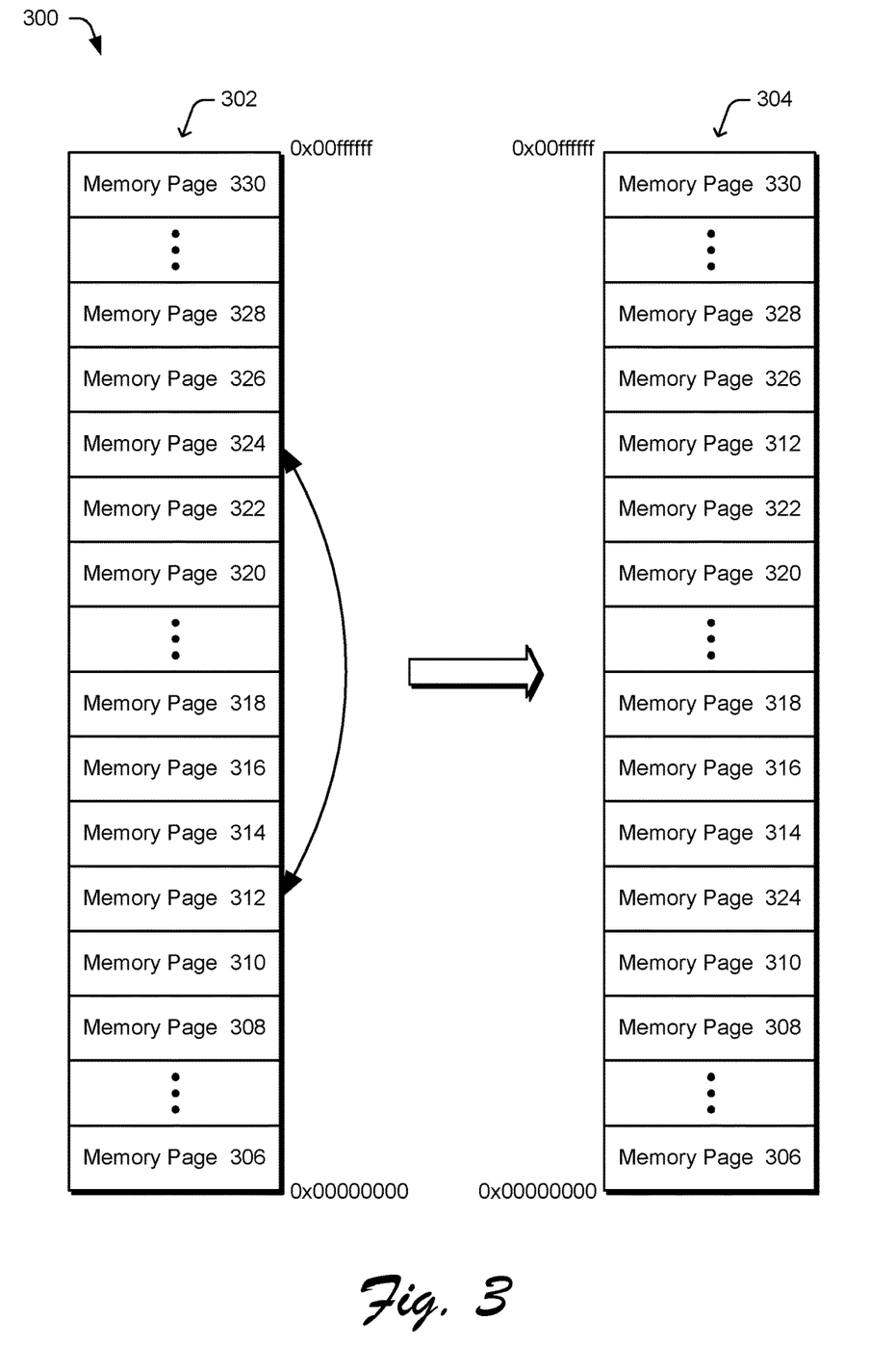
FIG. 3 illustrates an example of swapping a hot memory page and a cold memory page.

FIG. 3 illustrates an example 300 of swapping a hot memory page and a cold memory page. In the example 300, a current state 302 of physical memory ranging from address 0x00000000 to 0x00ffffff is illustrated. The current state 302 illustrates various memory pages 306, 308, 310, 312, 314, 316, 318, 320, 322, 324, 326, 328, and 330 being stored in the physical memory. In the example 300, assume that memory page 324 is a hot memory page and memory page 312 is a cold memory page. The page swapping module 204 swaps memory pages 312 and 324, resulting in a new state 304 of the physical memory. As illustrated, in the new state 304 the memory page 312 is now in the location of physical memory where memory page 324 had been, and the memory page 324 is now in the location of physical memory where the memory page 312 had been.

Swapping a hot memory page with a cold memory page mitigates unreliability in the physical memory by moving the hot memory page to a different location so that, for example, crosstalk is no longer introducing unreliability. For example, in the current state 302 of example 300, unreliability in adjacent memory pages 322 and 326 as well as non-adjacent memory pages 320 and 328 (and possibly other non-adjacent memory pages) was becoming possible due to the number of accesses to memory page 324. By moving memory page 312 (a cold memory page) to the physical memory location where memory page 324 had been stored, assuming memory page 312 continues to be a cold page the accesses to memory page 312 will not be sufficient to introduce unreliability in memory pages 320, 322, 326, and 328 (and other non-adjacent memory pages). Furthermore, by moving memory page 324 to the physical memory location where memory page 312 had been stored, even if memory page 324 continues to be accessed frequently it will take time for the accesses to the memory page 324 to reach a number where unreliability in adjacent memory pages 310 and 314 as well as non-adjacent memory pages 308 and 316 (and possibly other non-adjacent memory pages) becomes possible.

Returning to FIG. 2, in one or more implementations when the page swapping module 204 swaps a hot memory page and a cold memory page, the page swapping module 204 also sets the counter value for the hot memory page to the counter value that the cold memory page had. Additionally or alternatively, the page swapping module 204 sets the counter value for the hot memory page to a different value, such as 0. In one or more implementations the page swapping module 204 does not alter the counter value for the cold memory page.

The physical memory 104 is any of various types of memory as discussed above. In one or more implementations, the physical memory 104 is DRAM and electromagnetic coupling (crosstalk) results in frequent accesses (read accesses) to one page of memory creating disturbance errors in other pages of memory. In such implementations, the probabilistic data structure control module 202 receives physical memory page addresses 220 for read accesses and need not receive physical memory page addresses 220 for other types of accesses (e.g., write accesses). Accordingly, the counter values in hot/cold memory page table 208 are counts of read accesses to the physical memory page addresses. Furthermore, in such implementations the threshold value used by the page swapping module 204 to determine when to swap hot and cold memory pages is based on how many read accesses to a particular row of physical memory results in the adjacent and some non-adjacent rows becoming unreliable due to crosstalk.

Additionally or alternatively, the physical memory 104 is PCM and heat buildup resulting from frequent accesses (write accesses) to one page of memory causes at least one adjacent page to be unreliable. In such implementations, the probabilistic data structure control module 202 receives physical memory page addresses 220 for write accesses and need not receive physical memory page addresses 220 for other types of accesses (e.g., read accesses). Accordingly, the counter values in hot/cold memory page table 208 are counts of write accesses to the physical memory page addresses. Furthermore, in such implementations the threshold value used by the page swapping module 204 to determine when to swap hot and cold memory pages is based on how many write accesses to a particular row of physical memory results in at least one adjacent row becoming unreliable due to heat buildup.

Additionally or alternatively, the physical memory 104 is nonvolatile memory (such as Flash memory) that has a limited lifespan and is writable only a particular number of times before becoming unreliable. In such implementations, the probabilistic data structure control module 202 receives physical memory page addresses 220 for write accesses and need not receive physical memory page addresses 220 for other types of accesses (e.g., read accesses). Accordingly, the counter values in hot/cold memory page table 208 are counts of write accesses to the physical memory page addresses. Furthermore, in such implementations the threshold value used by the page swapping module 204 to determine when to swap hot and cold memory pages is lower than how many write accesses to a particular row of physical memory results in at least one adjacent row becoming unreliable due to too many write accesses. For example, a threshold value is set based on how many write accesses are typically performed to the rows of physical memory. E.g., if during a typical usage period (such as from power on to power off of the computing device including the page swapping module 204) rows of physical memory are typically accessed 25 times, the threshold value is set at 25. By way of another example, a threshold value is set based on (as a percentage of) an expected number of write accesses the rows of physical memory support over their lifetime. E.g., if the rows of physical memory support 100,000 write accesses over their lifetime, the threshold value is set at 0.1% or 100.

In the discussions herein, the example 200 of the page swapping memory protection system 106 architecture includes probabilistic data structure 206. Additionally or alternatively, the page swapping memory protection system 106 need not include the probabilistic data structure 206. In such situations hot/cold memory page table 208 would typically be larger because the probabilistic data structure 206 is not present to filter out physical memory page addresses from being entered in the hot/cold memory page table 208.

In one or more implementations, the page swapping memory protection system 106 includes the probabilistic data structure 206 (e.g., a bloom filter) as discussed above. Additionally or alternatively, the page swapping memory protection system 106 includes multiple (e.g., two) probabilistic data structures that are started and cleared at different times. For example, assume the page swapping memory protection system 106 includes two probabilistic data structures. When the page swapping memory protection system 106 begins operation, the first probabilistic data structure is started and the probabilistic data structure control module 202 adds physical memory page addresses to the first probabilistic data structure. After a particular amount of time, such as after a threshold number (e.g., 1000) of physical memory page addresses being added to the first probabilistic data structure, the second probabilistic data structure is started. The probabilistic data structure control module 202 then adds physical memory page addresses to both the first probabilistic data structure and the second probabilistic data structure. The probabilistic data structure control module 202 proceeds to perform address checks 222 using one or both of the first and second probabilistic data structures.

At some point in time the probabilistic data structure control module 202 determines to clear the probabilistic data structures. The probabilistic data structure control module 202 clears the first probabilistic data structure but does not clear the second probabilistic data structure. Accordingly, probabilistic data structure control module 202 continues to perform address checks using the second probabilistic data structure. After a particular amount of time, such as after a threshold number (e.g., 1000) of physical memory page addresses being added to the first probabilistic data structure, the second probabilistic data structure is cleared. By staggering the clearings of the probabilistic data structures, at least one probabilistic data structure is available for the probabilistic data structure control module 202 regardless of how often the probabilistic data structures are cleared.

Additionally or alternatively, the page swapping memory protection system 106 includes multiple (e.g., two) probabilistic data structures each associated with a different portion of physical memory 104. This increases the accuracy of the probabilistic data structures because the probabilistic data structures are a representation of smaller amounts of physical memory. For example, a different probabilistic data structure is associated with each bank or part of a bank of DRAM. E.g., if a bank of physical memory has a large number (e.g., over 500,000 rows), the bank is divided into multiple (e.g., four) regions each assigned to one of multiple (e.g., four) different probabilistic data structures. This enhances the accuracy of the probabilistic data structures as well as reduces the power and latency of accessing these probabilistic data structures because the probabilistic data structures are each maintaining a compact representation of a smaller amount of physical memory (e.g., one-quarter of the over 500,000 rows of physical memory).

In the discussions above, reference is made to the probabilistic data structure control module 202 performing address checks 222 using the physical memory page address 220 and the hot/cold memory page table 208 storing the physical memory page addresses. Additionally or alternatively, the page swapping memory protection system 106 uses a hash value generated by applying the physical memory page address 220 to a hash function rather than using the physical memory page address 220 itself. The hash value is generated by the page swapping memory protection system 106 or the hash value is received in place of the physical memory page address 220. The page swapping memory protection system 106 uses the hash value rather than the physical memory page address 220, performing access checks 222 or 226 with the hash value, storing the hash value in the cold memory page table 208, and so forth. This allows the page swapping memory protection system 106 to operate on, and store, smaller representations of the physical memory page address 220. For example, if the physical memory page address 220 is 128 bits, the hash value of the physical memory page address 220 is smaller, such as 32 bits. This reduces the space used for the hot/cold memory page table 208 and furthermore allows the hot/cold memory page table 208 to be implemented as a direct-mapped/indexed structure rather than as a content-addressable memory (CAM), which improves performance and power-efficiency of the page swapping memory protection system 106.

Use of the hash function typically results in collisions, such as where multiple physical memory page addresses have the same hash value. The hash value is thus also viewed as corresponding to a set of physical memory pages (those memory pages with physical memory page addresses that, when applying the hash function, result in the same hash value). Accordingly, if the page swapping module 204 determines to swap two memory pages based on a hash value of a physical memory page address 220, the page swapping module 204 identifies as a hot memory page each of the physical memory pages with a physical memory page address that has the same hash value as the physical memory page address 220. Each of these hot memory pages is swapped with a cold memory page. In one or more implementations, a hashing mechanism that is dependent on a memory address interleaving policy used for the physical memory 104 is used to reduce collisions for physical memory addresses that are mapped to the same physical bank, thus reducing the number of physical memory pages that are in the set corresponding to a given hash value.

In one or more implementations, the hot/cold memory page table 208 is partitioned into multiple zones, such as zones of 1000 physical memory page addresses. This allows the hot/cold memory page table 208 to use less space because a single zone value is maintained and then counter values ranging from 0 to the size of the zone are stored in the hot/cold memory page table 208. Accordingly, the counter value for each physical memory page address is smaller and is added to the zone value (which is stored only once) to determine the full counter value for each memory page address.

Additionally or alternatively, the hot/cold memory page table 208 groups multiple physical memory page addresses together and uses a single counter value corresponding to the group of physical memory page addresses. This allows the hot/cold memory page table 208 to use less space because fewer counter values are stored. If the page swapping module 204 determines that the counter value corresponding to a group of physical memory page addresses satisfies the threshold value, the page swapping module 204 identifies as a hot memory page each of the physical memory pages in the group of physical memory page addresses. Each of these hot memory pages is swapped with a cold memory page.

In the discussions herein, the page swapping memory protection system 106 is discussed as counter values in hot/cold memory page table 208 corresponding to physical memory page addresses beginning at a value of 1 and being incremented, and swapping physical memory pages when a counter value reaches a threshold value (e.g., 130,000 for DRAM). Additionally or alternatively, the page swapping memory protection system 106 is implemented in the opposite manner, where counter values in hot/cold memory page table 208 corresponding to physical memory page addresses beginning at a high value of (e.g., 130,000 for DRAM) and being decremented, and swapping physical memory pages when a counter value reaches a value of 0.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-3.

Figure 4:
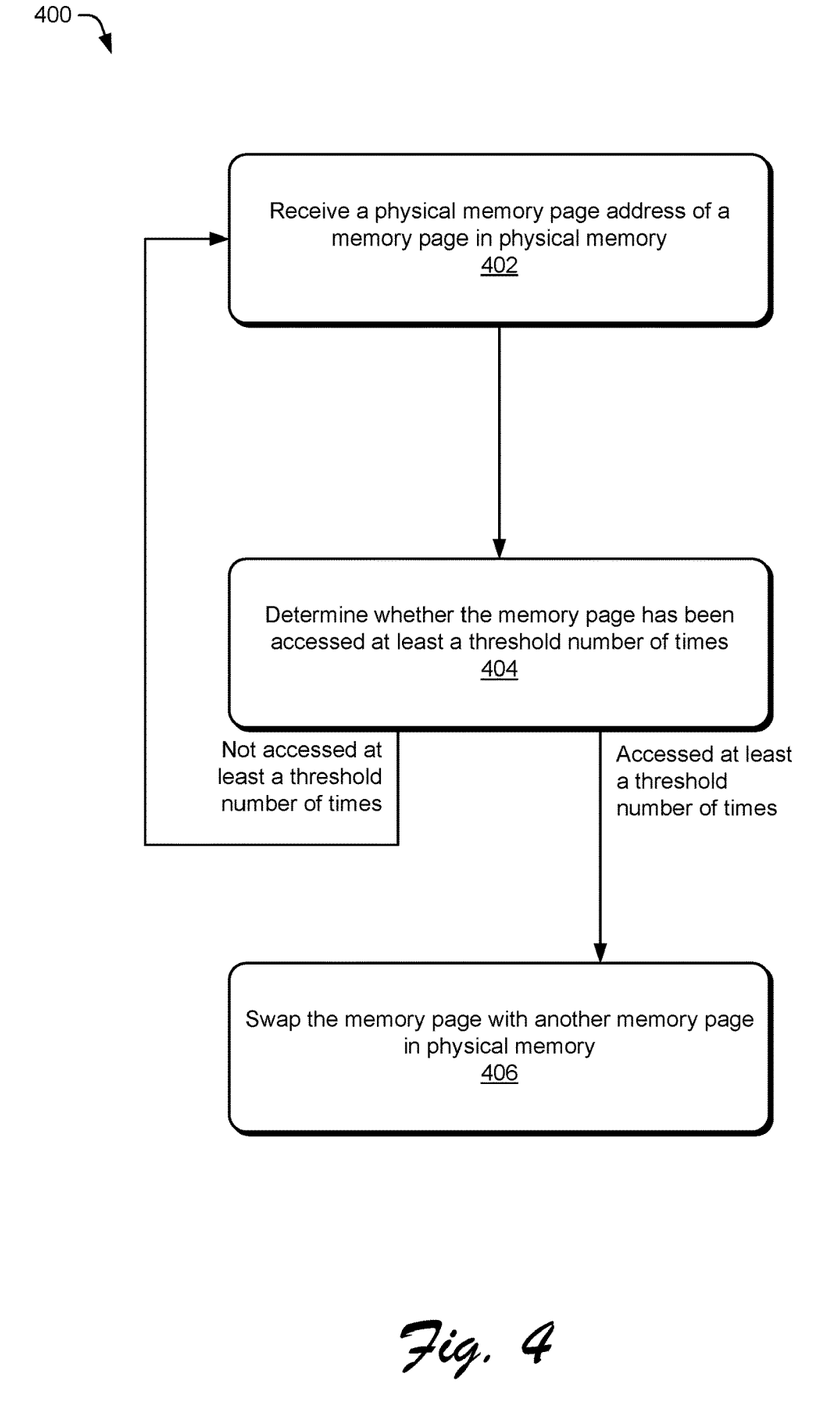
FIG. 4 is a flow diagram depicting a procedure in an example implementation of page swapping to protect memory devices.

FIG. 4 is a flow diagram 400 depicting a procedure in an example implementation of page swapping to protect memory devices. The flow diagram 400 is performed by a page swapping memory protection system such as page swapping memory protection system 106 of FIG. 1 or as shown in the example 200 of FIG. 2.

In this example, a physical memory page address of memory page in a physical memory is received (block 402). The physical memory page address is received from any of various sources, such as a page handler.

A determination is made as to whether the memory page has been accessed at least a threshold number of times (block 404). This determination is made, for example, using a counter value corresponding to the physical memory page address that is incremented each time the physical memory page is accessed.

If the memory page has not been accessed at least the threshold number of times, the flow diagram 400 returns to block 402 to receive another physical memory page address.

However, if the memory page has been accessed at least the threshold number of times, the memory page is swapped with another memory page in physical memory (block 406). This other memory page in physical memory is a memory page that has not been accessed at least the threshold number of times.

Figure 5:
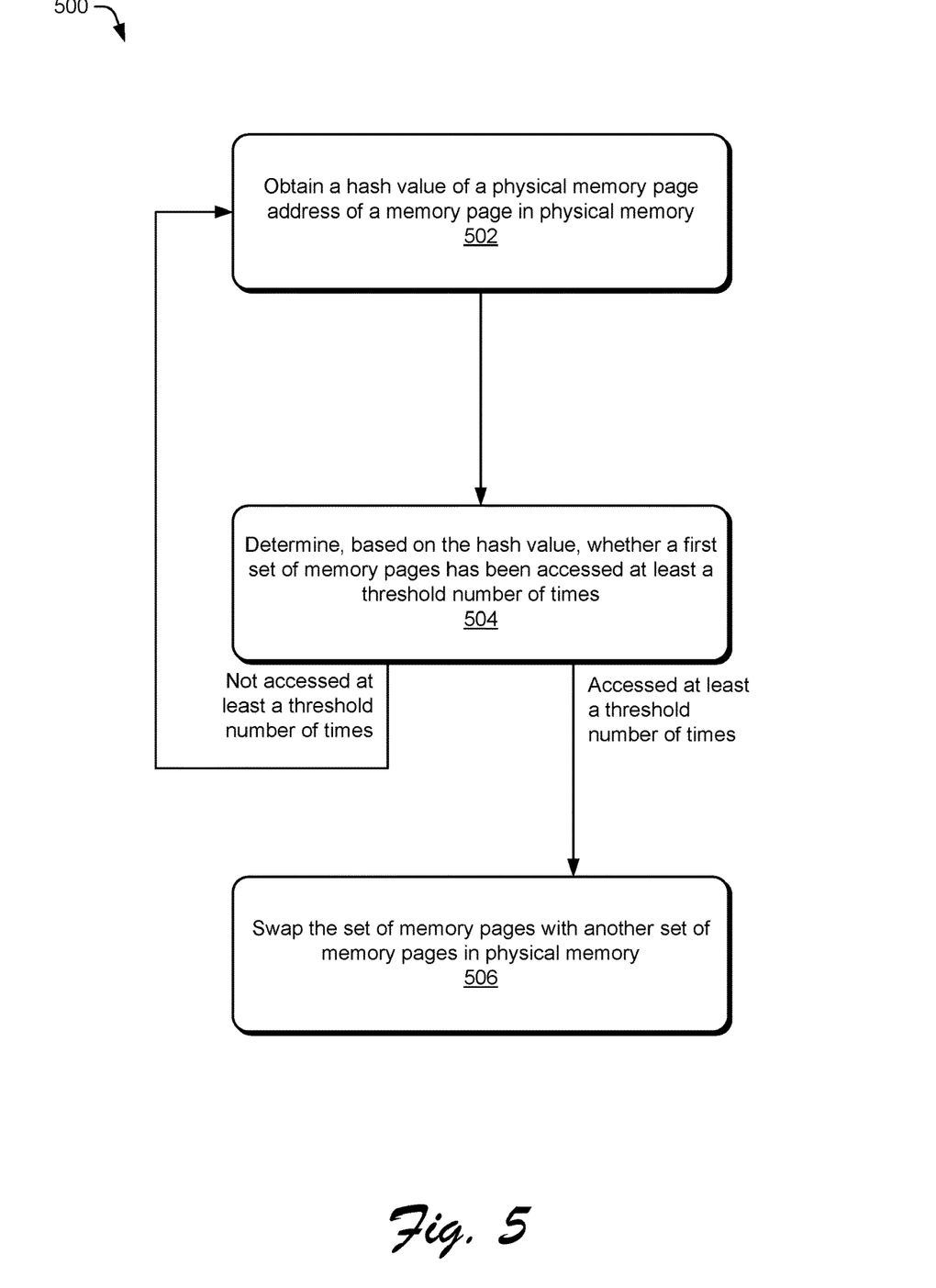
FIG. 5 is a flow diagram depicting a procedure in another example implementation of page swapping to protect memory devices.

FIG. 5 is a flow diagram 500 depicting a procedure in an example implementation of page swapping to protect memory devices. The flow diagram 500 is performed by a page swapping memory protection system such as page swapping memory protection system 106 of FIG. 1 or as shown in the example 200 of FIG. 2.

In this example, a hash value of physical memory page address of memory page in a physical memory is obtained (block 502). The physical memory page address is received from any of various sources, such as a page handler. The hash value is obtained by applying a hash function to the physical memory page address.

A determination is made, based on the hash value, as to whether a first set of memory pages has been accessed at least a threshold number of times (block 504). This determination is made, for example, using a counter value corresponding to the hash value that is incremented each time one of the first set of memory pages has been accessed.

If the first set of memory pages has not been accessed at least the threshold number of times, the flow diagram 500 returns to block 502 to obtain another hash value.

However, if the first set of memory pages has been accessed at least the threshold number of times, the first set of memory pages is swapped with another set of memory pages in physical memory (block 506). This other set of memory pages in physical memory are memory pages that have not been accessed at least the threshold number of times.

Figure 6:
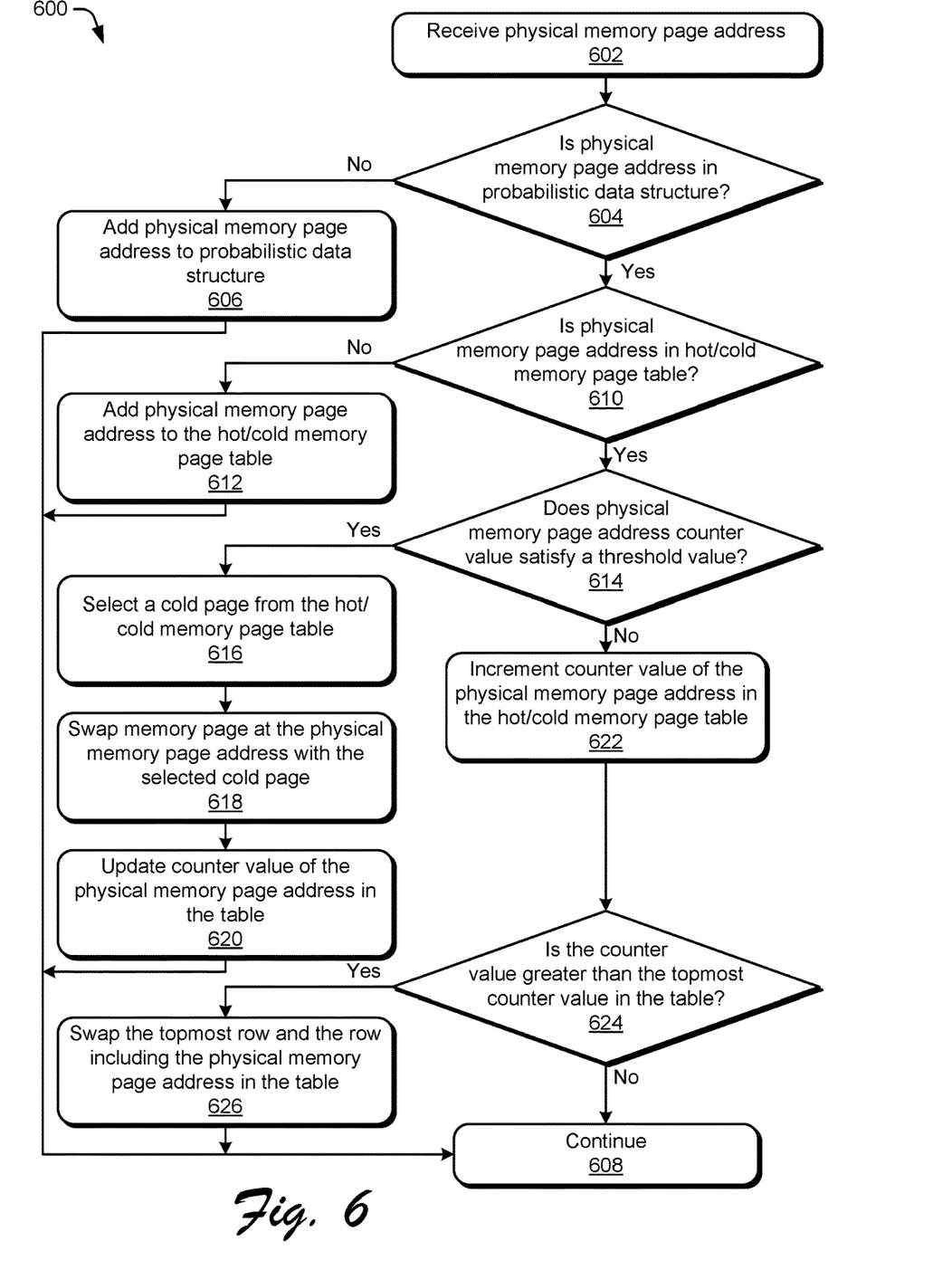
FIG. 6 is a flow diagram depicting a procedure in another example implementation of page swapping to protect memory devices.

FIG. 6 is a flow diagram 600 depicting a procedure in an example implementation of page swapping to protect memory devices. The flow diagram 600 is performed by a page swapping memory protection system such as page swapping memory protection system 106 of FIG. 1 or as shown in the example 200 of FIG. 2.

In this example, a physical memory page address is received (block 602). The physical memory page address is received from any of various sources, such as a page handler.

A check is made as to whether the physical memory page address is included in a probabilistic data structure (block 604). The probabilistic data structure is, for example, one or more bloom filters.

If the physical memory page address is not in the probabilistic data structure, the physical memory page address is added to the probabilistic data structure (block 606). The physical memory page address is added to the probabilistic data structure in various manners, such as by applying one or more hash functions to the physical memory page address and setting bits corresponding to the resultant hash value to a particular value (e.g., 1). The flow diagram 600 then continues (block 608), such as by receiving another physical memory page address.

However, if the physical memory page address is in the probabilistic data structure, a check is made as to whether the physical memory page address is in a hot/cold memory page table (block 610).

If the physical memory page address is not in the hot/cold memory page table, the physical memory page address is added to the hot/cold memory page table (block 612). The physical memory page address is added to an empty row in the hot/cold memory page table or replaces a row in the hot/cold memory page table where another physical memory page address was stored. The flow diagram 600 then continues (block 608), such as by receiving another physical memory page address.

However, if the physical memory is in the hot/cold memory page table, a check is made as to whether a physical memory page address counter value corresponding to the physical memory page address satisfies (e.g., equals or exceeds) a threshold value (block 614).

If the physical memory page address counter value satisfies the threshold value, a cold page is selected from the hot/cold memory page table (block 616). The cold page is selected, for example, by selecting a physical memory page address that has a corresponding counter value that is a smallest value in the hot/cold memory page table (e.g., the bottommost physical memory page address in the hot/cold memory page table).

The physical memory page address is swapped with the selected cold page (block 618).

The counter value of the physical memory page address is updated (block 620). The counter value is updated to be, for example, to be the counter value of the selected cold page.

The flow diagram 600 then continues (block 608), such as by receiving another physical memory page address.

Returning to block 614, if the physical memory page address counter value does not satisfy the threshold value, the counter value of the physical memory page address in the hot/cold memory page table is incremented (block 622).

A check is then made as to whether the counter value of the physical memory page address is greater than the topmost counter value in the hot/cold memory page table (block 624). The flow diagram 600 then continues (block 608), such as by receiving another physical memory page address.

If the counter value of the physical memory page address is greater than the topmost counter value in the hot/cold memory page table, the topmost row in the hot/cold memory page table is swapped with the row including the physical memory page address (block 626). This swapping allows the hot/cold memory page to, over time, be sorted so that the topmost row of the table has the largest counter value, and the bottommost row of the table has the smallest counter value. The flow diagram 600 then continues (block 608), such as by receiving another physical memory page address.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the memory interface 102, the page swapping memory protection system 106, the probabilistic data structure control module 202, the page swapping module 204, and the probabilistic data structure 206) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving a first physical memory page address of a first memory page in a physical memory and a second physical memory page address of a second memory page in the physical memory;
checking a table that tracks accesses to physical memory page addresses;
swapping, in response to a first counter value in the table that tracks accesses to the first physical memory page address equaling or exceeding a threshold number of accesses, the first memory page with a third memory page in the physical memory that has been accessed fewer than the threshold number of accesses; and
swapping, in response to a second counter value in the table that tracks accesses to the second physical memory page address being greater than a third counter value that tracks accesses to a topmost physical memory page address in the table, a row in the table including the second physical memory page address with a row in the table including the topmost physical memory page address.

2. The method of claim 1, wherein the physical memory is dynamic random access memory, the first counter value and the second counter value indicating numbers of read accesses to the first memory page and the second memory page, respectively.

3. The method of claim 1, wherein the physical memory is phase-change memory, the first counter value and the second counter value indicating numbers of write accesses to the first memory page and the second memory page in the phase-change memory, respectively.

4. The method of claim 1, wherein the physical memory is Flash memory, the first counter value and the second counter value indicating numbers of write accesses to the first memory page and the second memory page, respectively.

5. The method of claim 1, further comprising checking whether the first physical memory page address is in a probabilistic data structure, wherein the table is checked for the first counter value in response to the first physical memory page address being in the probabilistic data structure.

6. The method of claim 1, further comprising:
receiving a third physical memory page address of a fourth memory page in the physical memory;
checking the table for the third physical memory page address; and
in response to the third physical memory page address missing from the table:
removing a bottommost physical memory page address from the table; and
replacing the bottommost physical memory page address with the third physical memory page address and setting a fourth counter value corresponding to the third physical memory page address in the table to a value of 1.

7. The method of claim 1, the method further comprising setting, in response to swapping the first memory page with the third memory page, the first counter value to be less than or equal to a number of accesses indicated by a fourth counter value in the table associated with the third memory page.

8. A method comprising:
obtaining a first hash value generated by applying a hash function to a physical memory address of a first memory page in a physical memory, the first hash value corresponding to a first set of memory pages including the first memory page;
checking a probabilistic data structure for the first hash value;
checking a table for the first hash value in response to detecting the first hash value within the probabilistic data structure; and
swapping, in response to the table indicating that the first set of memory pages has been accessed at least a threshold number of times, the first set of memory pages with a second set of memory pages in the physical memory that have been accessed fewer than the threshold number of times.

9. The method of claim 8, wherein checking the table includes checking the table for the first hash value only in response to the first hash value being detected within the probabilistic data structure.

10. The method of claim 8, wherein checking the table includes checking whether a first counter value corresponding to the first hash value in the table equals or exceeds the threshold number of times.

11. The method of claim 10, further comprising:
obtaining a second hash value by applying the hash function to a physical memory page address of a second memory page in the physical memory, the second hash value corresponding to a third set of memory pages including the second memory page;
checking the table for the second hash value; and
in response to the second hash value missing from the table:
removing a bottommost hash value from the table; and
replacing the bottommost hash value with the second hash value and setting a second counter value corresponding to the second hash value in the table to a value of 1.

12. The method of claim 10, further comprising:
obtaining a second hash value by applying the hash function to a physical memory page address of a second memory page in the physical memory, the second hash value corresponding to a third set of memory pages including the second memory page;
accessing, based on the second hash value, a second counter value in the table indicating whether the third set of memory pages has been accessed at least the threshold number of times; and
incrementing, in response to the second counter value indicating that the third set of memory pages has been accessed fewer than the threshold number of times, the second counter value corresponding to the second hash value in the table.

13. The method of claim 12, further comprising:
obtaining a third counter value corresponding to a third hash value that is a topmost hash value in the table;
comparing the second counter value to the third counter value; and
swapping, in response to the second counter value being greater than the third counter value, a row in the table including the second hash value with a row in the table including the third hash value.

14. A system comprising:
a probabilistic data structure control circuit to receive a first physical memory address of a first memory page in a physical memory and check a probabilistic data structure for the first physical memory address; and
a page swapping circuit to:
check a table for the first physical memory address in response to the first physical memory address being represented in the probabilistic data structure;
swap, in response to the table indicating that the first memory page has been accessed at least a threshold number of times, the first memory page with a second memory page in the physical memory that has been accessed fewer than the threshold number of times; and
set, in response to the first memory page being swapped with the second memory page, a first counter value that tracks accesses to the first memory page to be less than or equal to a second counter value that tracks accesses to the second memory page.

15. The system of claim 14, wherein the physical memory is dynamic random access memory and to check the table for the first physical memory address, the page swapping circuit is to access the first counter value from the table indicating a number of read accesses to the first memory page and compare the number of read accesses to the threshold number of times.

16. The system of claim 14, wherein the physical memory is Flash memory and to check the table for the first physical memory address, the page swapping circuit is to access the first counter value from the table indicating a number of write accesses to the first memory page and compare the number of write accesses to the threshold number of times.

17. The system of claim 14, wherein the table is stored within a cache, and the probabilistic data structure includes physical memory addresses that are present in the cache.

18. The system of claim 14, wherein to set the first counter value, the page swapping circuit is further to set the first counter value to be equal to the second counter value.

19. The system of claim 14, wherein to check the table, the page swapping circuit is to check whether the first counter value corresponding to the first physical memory address in the table equals or exceeds the threshold number of times.

20. The system of claim 19, wherein:

the probabilistic data structure control circuit is further to receive a second physical memory page address of a third memory page in the physical memory; and the page swapping circuit is further to access a third counter value in the table indicating whether the third memory page has been accessed at least the threshold number of times, and increment, in response to the third counter value indicating that the third memory page has been accessed fewer than the threshold number of times, the third counter value corresponding to the second physical memory page address in the table.

* * * * *